US012240756B2

(12) United States Patent
Ambrosetti et al.

(10) Patent No.: US 12,240,756 B2
(45) Date of Patent: Mar. 4, 2025

(54) SOLAR RECEIVER-REACTOR

(71) Applicants: SYNHELION SA, Chur (CH); ENI S.P.A, Rome (IT)

(72) Inventors: Gianluca Ambrosetti, Zurich (CH); Philipp Good, Zurich (CH)

(73) Assignees: Synhelion SA, Chur (CH); ENI S.P.A., Rome (IT)

( * ) Notice: Subject to any disclaimer, the term of this patent is extended or adjusted under 35 U.S.C. 154(b) by 882 days.

(21) Appl. No.: 17/051,693

(22) PCT Filed: May 3, 2019

(86) PCT No.: PCT/CH2019/050009
§ 371 (c)(1),
(2) Date: Oct. 29, 2020

(87) PCT Pub. No.: WO2019/213787
PCT Pub. Date: Nov. 14, 2019

(65) Prior Publication Data
US 2021/0229988 A1   Jul. 29, 2021

(30) Foreign Application Priority Data

May 7, 2018   (CH) ..................... 00568/18
Aug. 9, 2018  (CH) ..................... 00974/18

(51) Int. Cl.
C01B 3/06    (2006.01)
B01J 15/00   (2006.01)
(Continued)

(52) U.S. Cl.
CPC ............ C01B 3/063 (2013.01); B01J 15/00 (2013.01); B01J 19/127 (2013.01); F24S 20/20 (2018.05);
(Continued)

(58) Field of Classification Search
None
See application file for complete search history.

(56) References Cited

U.S. PATENT DOCUMENTS

2006/0188433 A1   8/2006   Weimer et al.

FOREIGN PATENT DOCUMENTS

DE   102010053902 A1   6/2012
EP        2728022 A1   5/2014
(Continued)

OTHER PUBLICATIONS

Furler, Philipp, "Solar Thermochemical $CO_2$ and $H_2O$ Splitting Via Ceria Redox Reactions," Diss. Etho No. 21864, 202 Pages.
(Continued)

Primary Examiner — Colin W. Slifka
(74) Attorney, Agent, or Firm — Henry Patent Law Firm PLLC

(57) ABSTRACT

The invention relates to a method for producing syngas by means of solar radiation, in which the reactor of a receiver-reactor is periodically heated via an aperture provided in the same for solar radiation by means of the solar radiation to an upper reduction temperature for a reduction process and subsequently cooled to a lower oxidation temperature for an oxidation process in the presence of an oxidation gas, wherein the sunlight is guided through an absorption chamber onto an absorber configured as a reactor, which includes a reducible/oxidizable material, and wherein a gas that absorbs the black-body radiation of the absorber is guided through the absorption chamber and the absorption chamber is configured so that the back radiation of the absorber through the aperture is essentially absorbed by the gas. Radiation losses caused by back radiation of the black-body radiation exiting the optical aperture are thus avoided in accordance with the invention. The heat of the back radia- (Continued)

Figure 1A:
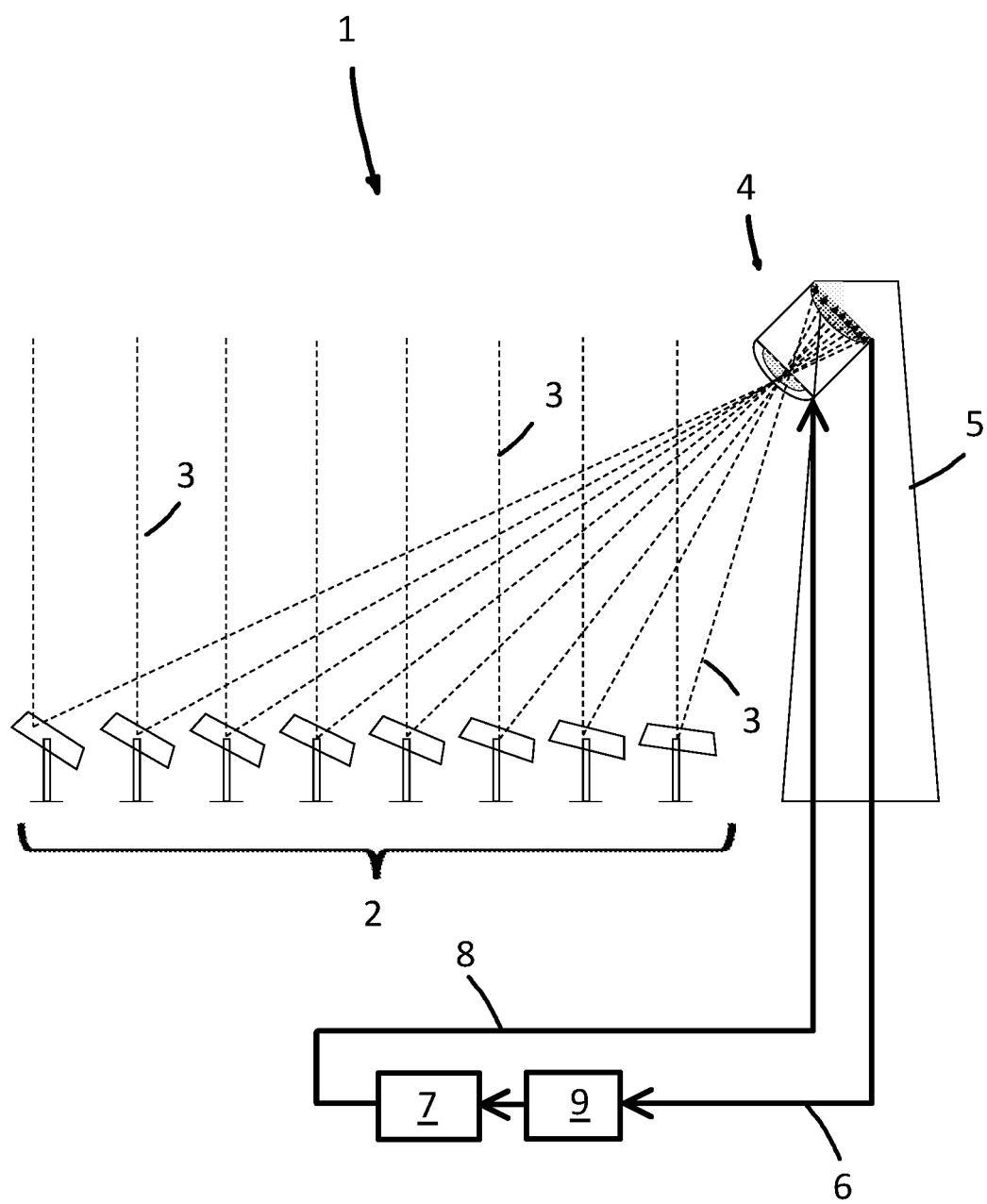

tion, however, can be utilized directly in the heat-transporting fluid and is available for a flexible usage. The receiver-reactor has a simple design and is suitable as a low-cost receiver-reactor.

29 Claims, 13 Drawing Sheets

(51) Int. Cl.
- *B01J 19/12* (2006.01)
- *F24S 20/20* (2018.01)
- *F24S 50/40* (2018.01)
- *F24S 80/00* (2018.01)
- *F24S 90/00* (2018.01)

(52) U.S. Cl.
CPC ............... *F24S 50/40* (2018.05); *F24S 90/00* (2018.05); *B01J 2219/0871* (2013.01); *B01J 2219/0886* (2013.01); *B01J 2219/1203* (2013.01); *F24S 2080/03* (2018.05)

(56) References Cited

FOREIGN PATENT DOCUMENTS

| WO | WO-2011/072410 A1 | 6/2011 |
| WO | WO-2016/172144 A1 | 10/2016 |
| WO | WO-2017/197536 A1 | 11/2017 |

OTHER PUBLICATIONS

Buck, et al., "Receiver for solar-hybrid gas turbine and combined cycle systems," J. Phys. IV France 9 (1999), 8 pages.

Alvarez Rodriguez, C., "International Search Report" for PCT/CH2019/050009, mailed Aug. 20, 2019, 4 pages.

Agrafiotis, Christos, et al., "A review on solar thermal syngas production via redox pair-based water/carbon dioxide splitting thermochemical cycles", Renewable and Sustainable Energy Reviews 42 (2015) 254-285, 2015, 32 pages.

SOLAR RECEIVER-REACTOR

The present invention relates to a solar receiver-reactor, i.e. a reactor that is powered directly by the energy of solar radiation.

One of its numerous applications lies in the area of the production of solar fuels, the resulting materials of which, $H_2$ (hydrogen) and CO (carbon monoxide), are formed by supplying energy—i.e. heat at high temperatures—from $H_2O$ (water) and $CO_2$ (carbon dioxide). A gas mixture consisting primarily of $H_2$ and CO—among other gases—is called synthesis gas or simply syngas. This syngas is utilized in the production of liquid or gaseous hydrocarbon fuels.

Syngas is preferably obtained by means of a redox reaction so that the reactor must be operated alternately between a higher temperature, the reduction temperature $T_{red}$, and a lower temperature, the oxidation temperature $T_{ox}$.

ETH Dissertation No. 21864 "SOLAR THERMO-CHEMICAL CO2 AND H2O SPLITTING VIA CERIA REDOX REACTIONS" by Philipp Furier describes an experimental solar cerium reactor with which synthesis gas can be produced by means of irradiation with concentrated sunlight (2865 suns, i.e. a thermal radiation of up to 2865 $kW/m^2$).

Sunlight in the aforementioned concentration can be generated on an industrial basis, for example, with a parabolic concentrator in accordance with WO 2011/072410 so that the commercial production of synthesis gas using renewable or regenerable energy has become realistic. Moreover, sunlight is currently increasingly being generated in a sufficiently concentrated form in solar tower power plants, in which, however, receiver-reactors are generally not provided, but rather heat is generated which is used as industrial heat by a consumer or, for example, for the generation of electricity. The receiver of the tower power plant accordingly heats a heat-transporting medium to a temperature $T_O$, said medium being cooled by the consumer and reaching the receiver in the circuit with a temperature $T_{in}$ for reheating.

Spatially configured receivers suitable for high temperatures reached, e.g., at a concentration of 500 suns, 1000 suns or more, are used predominantly in solar tower power plants. Such temperatures are generally over 800 K and may reach the range of 1500 K or more in the near future. Such receivers can also be used with parabolic concentrators, although on a smaller scale. In the present disclosure, spatial receivers signify receivers whose measurements are relatively large in all three dimensions, as opposed to tube-shaped receivers used in conjunction with trough collectors. These tube-shaped receivers have one dimension, the length, which is a multiple, in the order of ten times, a hundred times or more, of the cross-sectional measurements of width or height. Receivers for trough collectors are not configured for the aforementioned temperatures, as a trough-shaped concentrator concentrates in two dimensions in relation to the receiver, while the field of heliostats at a tower power plant or a parabolic concentrator concentrates in three dimensions.

Volumetric receivers, inter alia, that are also suitable for solar tower power plants are known, wherein the required temperatures of more than 800 K, up to 1300 K, can be reached in such receivers. However, the high operating temperatures entail considerable expenditure in terms of construction.

Volumetric receivers possess an extensive absorber structure, which can consist, for example, in a voluminous wire mesh or an openly porous ceramic foam. The concentrated solar radiation penetrates in this case into the interior of the absorber structure and is absorbed there. A heat-transporting medium such as air is guided through the openly porous absorber structure and thus absorbs heat by forced convection on the openly porous absorber structure. The absorber structure can also consist in a tube structure, a grid structure staggered in the depth direction or in principle any structure with a large surface that causes a convective heat transfer from the absorber structure to the heat-transporting medium when the latter flows through the absorber.

A volumetric receiver has become known, for example, through the REFOS project (Receiver for solar-hybrid gas turbine and combined cycle systems; R. Buck, M. Abele, J. Kunberger, T. Denk, P. Heller and E. Lüpfert, in Journal de Physique IV France 9 (1999)). By means of a receiver of the type of the disclosed REFOS receiver, an outlet temperature $T_{out}$ of 1100 K can be achieved with a ceramic absorber of 1300 K.

Such receivers have the disadvantage that the absorber structure is costly to produce and the flow through the absorber is often unstable, in particular as the result of an undesired temperature distribution during operation, and that it is necessary to tolerate considerable flow losses for said flow.

According to the aforementioned ETH dissertation, cerium is reduced in a first, endothermic process step up to an upper temperature of 1800 K with the formation of oxygen; the cerium is subsequently cooled to a lower temperature of 1100 K after the completion of the reduction and, in a subsequent process step, the synthesis gas is produced by exothermic reoxidation; the heat required for the endothermic production of the syngas is, however, much greater here than the exothermic heat resulting from the oxidation. This process can be repeated cyclically for a continuous production of synthesis gas; to this end, the cerium must be consistently periodically heated to 1800 K and cooled to 1100 K. For a recuperation of heat removed by the cooling, a double-ring structure of a cerium substrate is proposed.

Two cerium rings rotating in opposite directions, in contact with one another and with a common axis of rotation lie between the warm zone (1800 K) and the cold zone (1100 K) in a such a manner that a section of each ring is located in the warm zone at the 12 o'clock position and an opposite section is located in the cold zone at the 6 o'clock position. By means of an opposite rotation of cerium rings which are directly adjacent to each other, the cold section of a first cerium ring moves clockwise in the direction of the warm zone and the warm section moves in the direction of the cold zone and, in the case of a second cerium ring rotating in the counter-clockwise direction, the cold section also moves in the direction of the warm zone and the warm section moves in the direction of the cold zone, wherein the two cerium rings brush past each other and thereby constantly exchange thermal energy. Accordingly, warm sections are cooled and cold sections are heated in a reciprocal manner, which renders possible a recuperation of a quantity of heat. The rate of efficiency of the recuperation, however, is poor due to its design and lies at approximately 25%. The design and stability requirements—heat transfer, heat emission and mechanical work—of counter-rotating cerium rings in contact with one another are considerable.

It is thus the object of the invention to provide a receiver-reactor with a simple design and a high degree of efficiency.

By having the absorber form the redox reactor in a solar receiver and arranging an absorption area for the black-body radiation of the absorber upstream from the same in the path of the solar radiation, the heat losses of the system are reduced significantly without extra expenditure in terms of construction. If a gas that absorbs the black-body radiation of the absorber is further used as the oxidizing gas, the design is simplified still further, as in this case the absorption area can be simultaneously used as a reactor area with a simple configuration and acts as a shielding zone for the back radiation.

In addition to the set object, the heat of the back radiation can be provided for the periodic heating of the absorber to the reduction temperature and/or for a usage external to the receiver-reactor, as is the case with conventional receivers.

The concept according to the invention, i.e. the greatest possible and thus almost complete shielding of the receiver-reactor by absorptive gases basically renders the high temperatures required for the redox reaction possible by means of a simple, industrially applicable design of the receiver.

Further preferred embodiments include the features of the dependent claims.

Figure 1B:
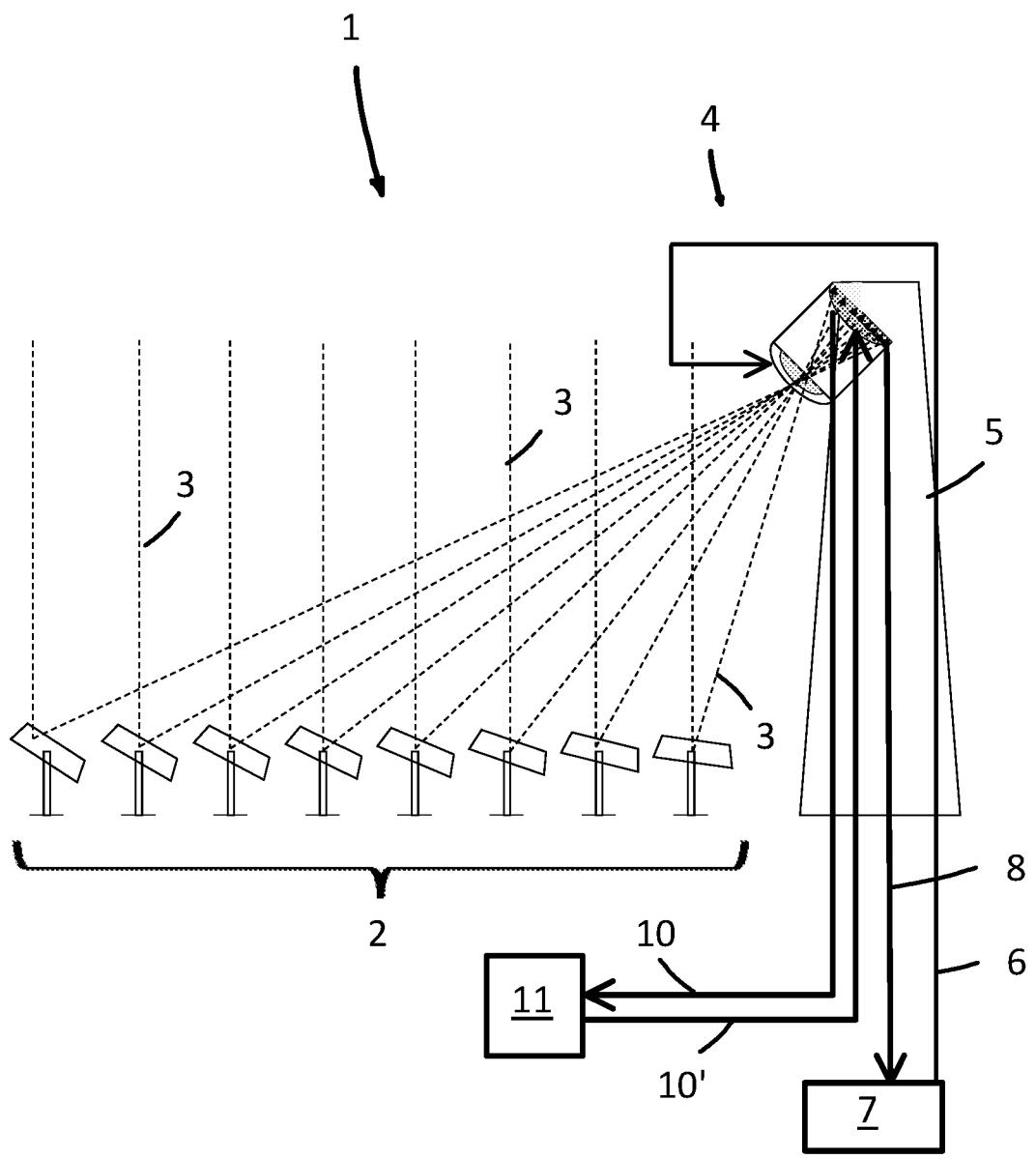
Figure 2A:
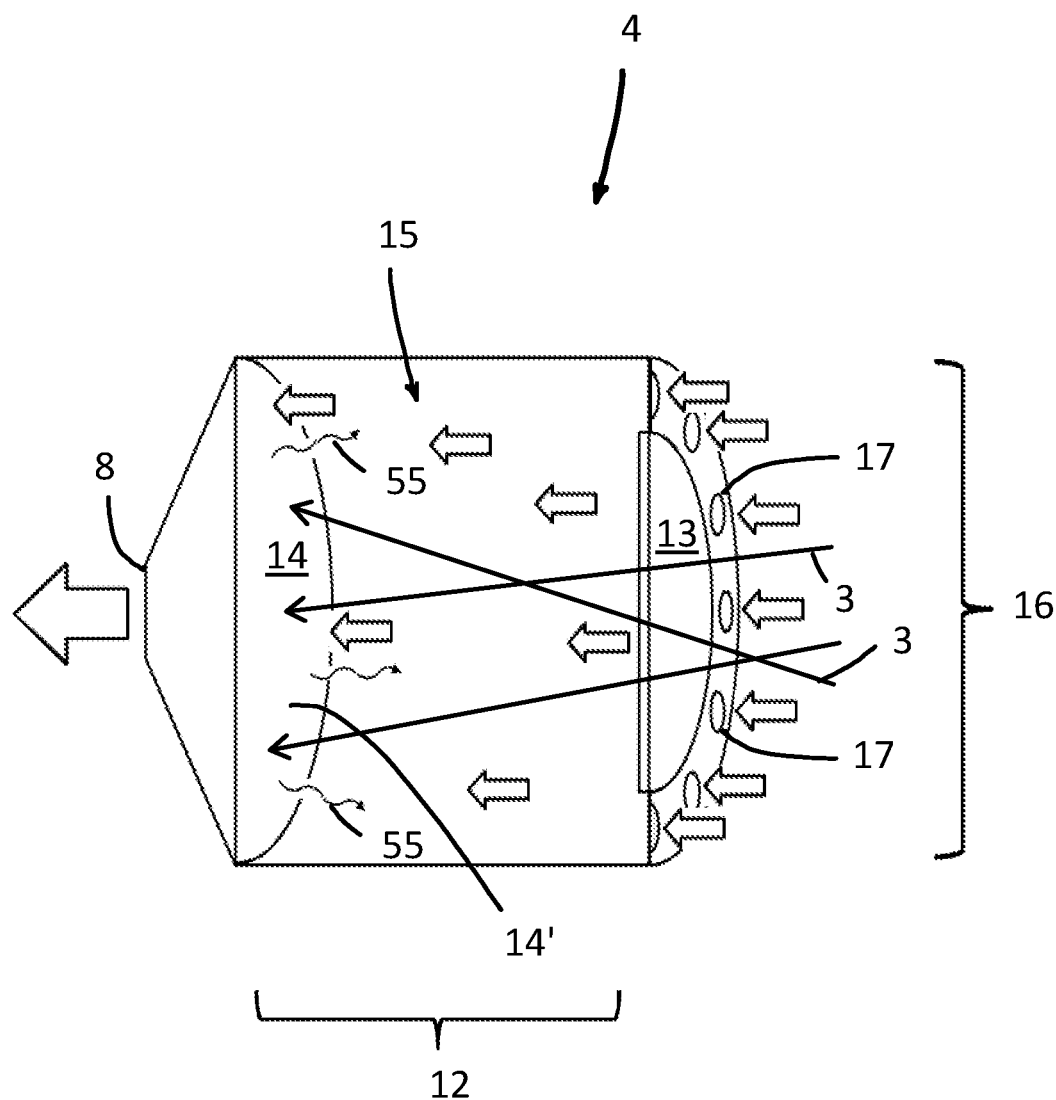
Figure 2B:
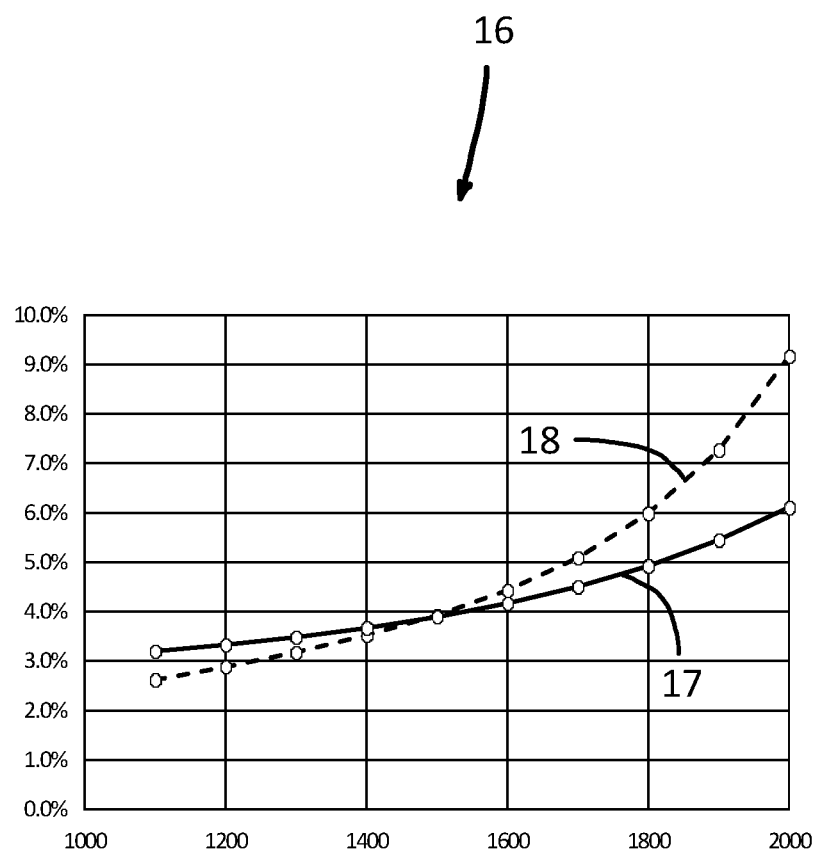
Figure 3A:
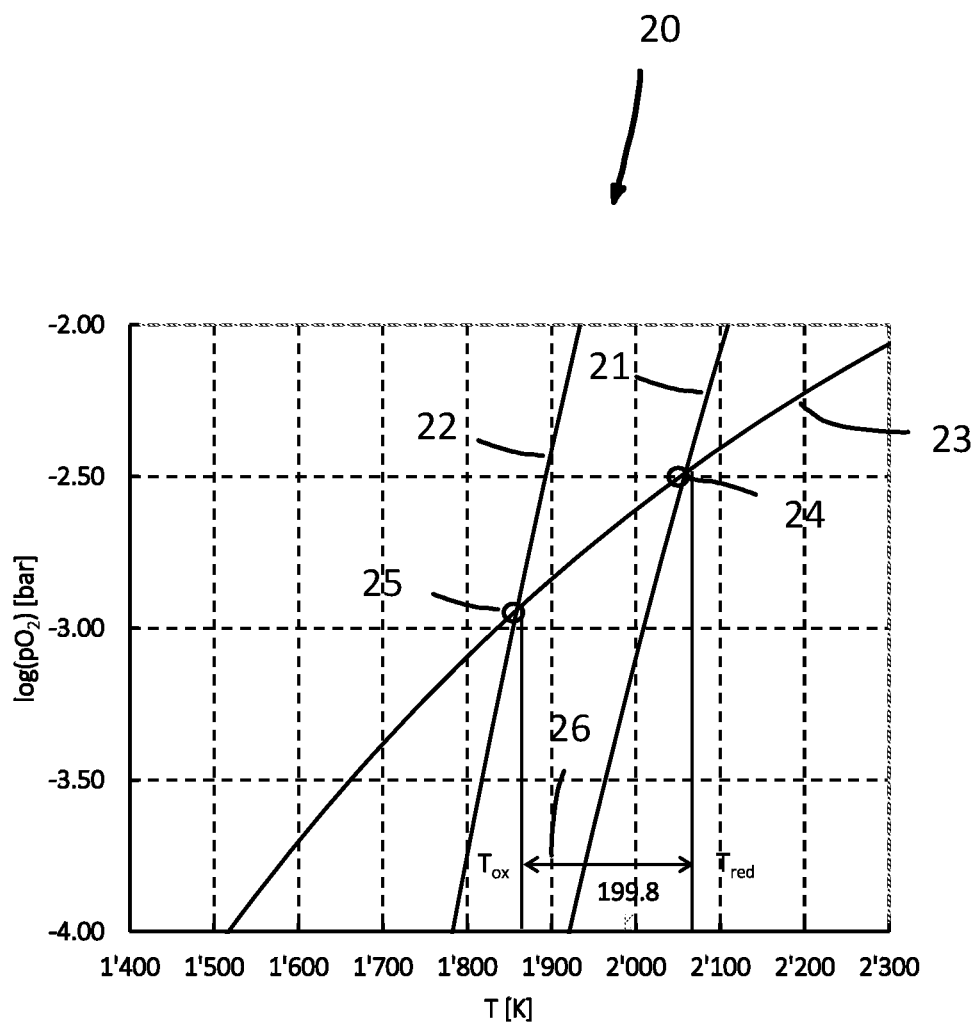
Figure 3B:
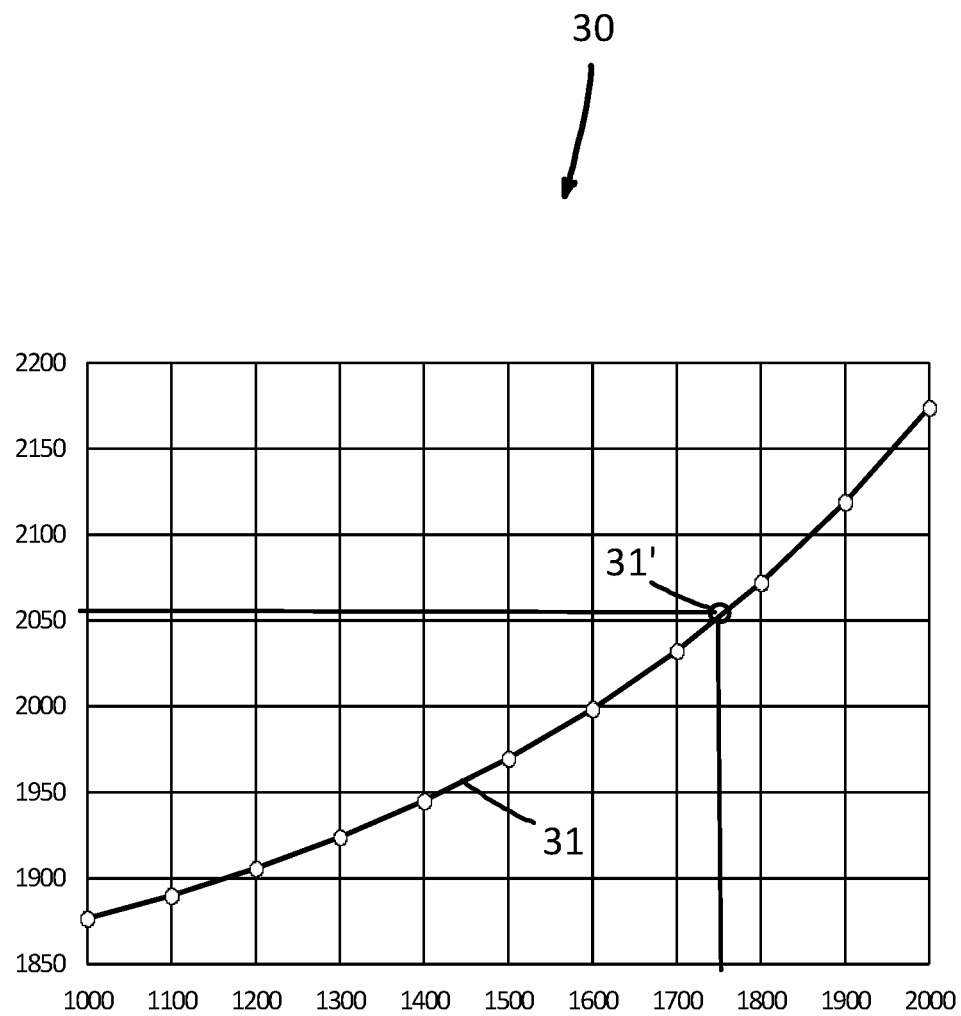
Figure 3C:
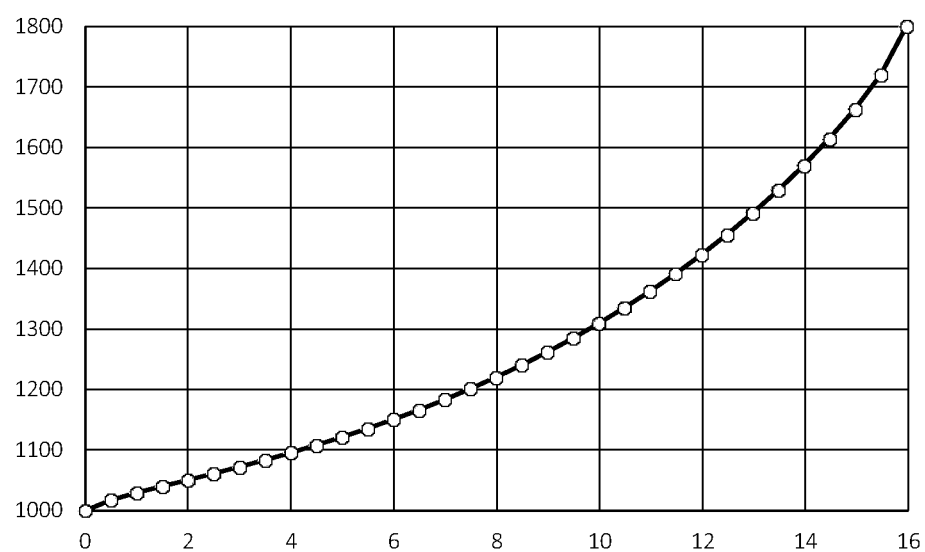
Figure 4A:
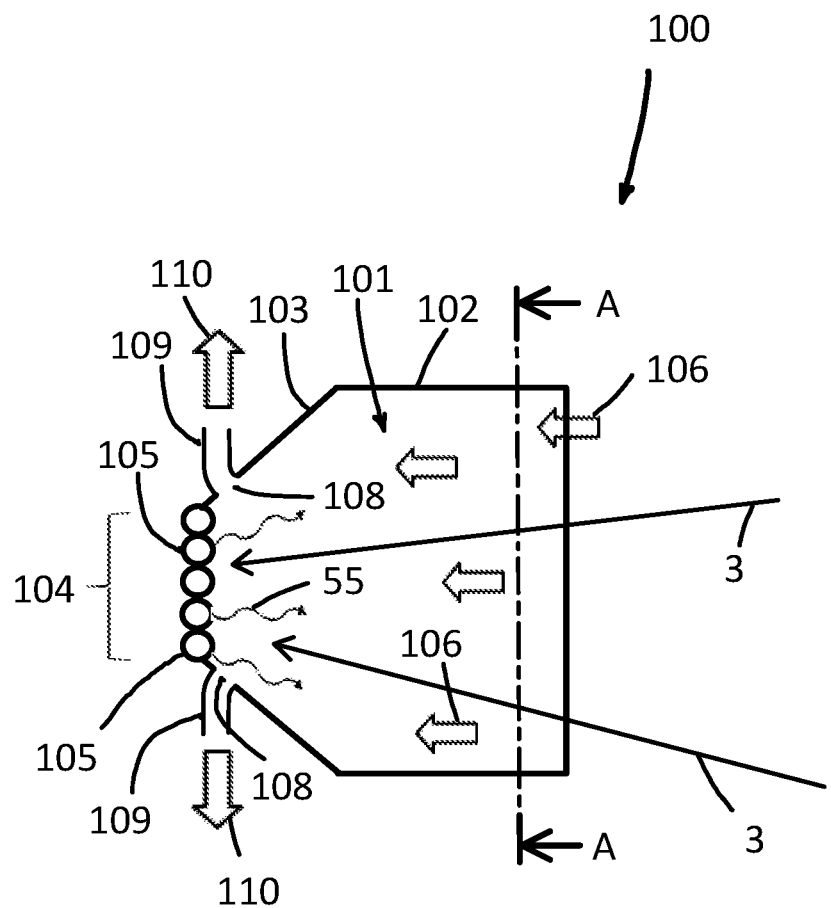
Figure 4B:
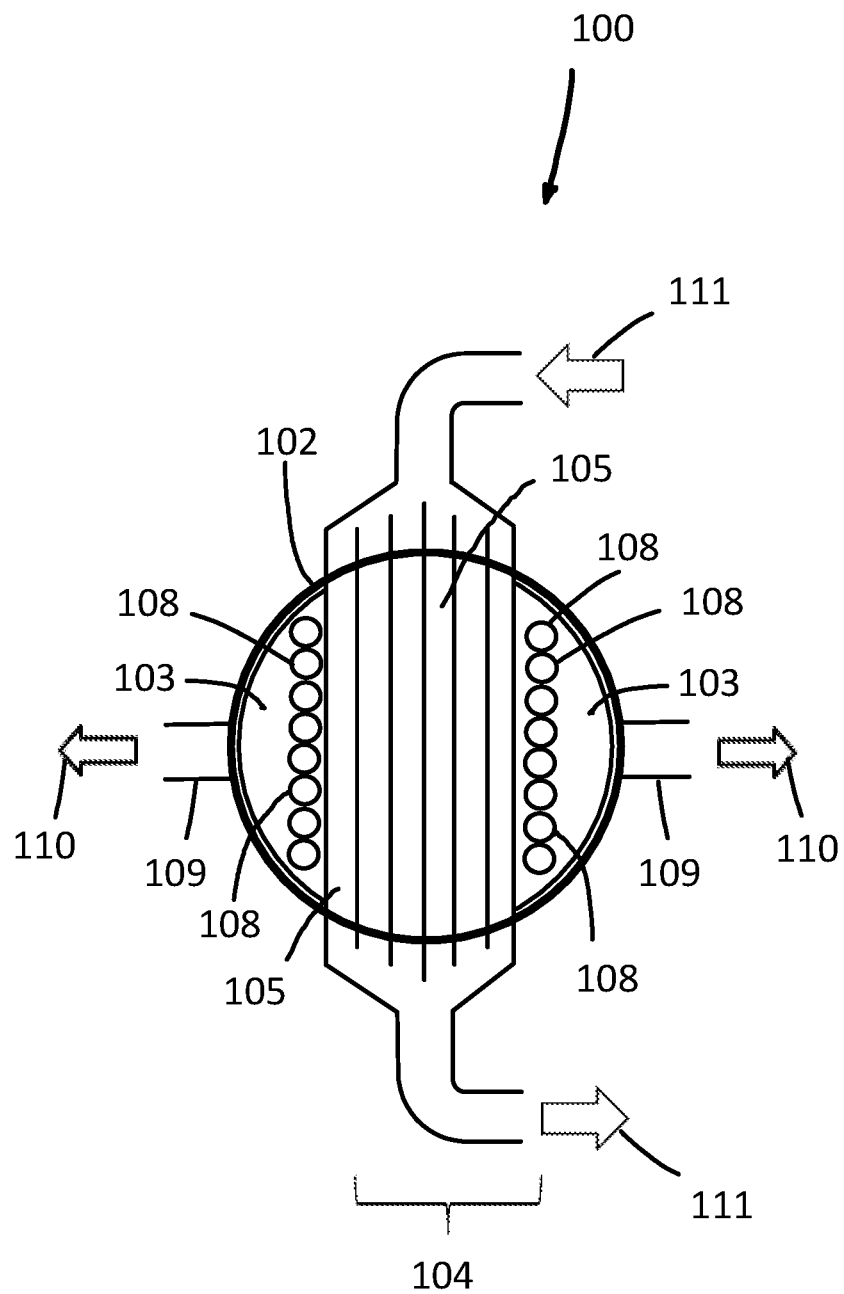
Figure 5A:
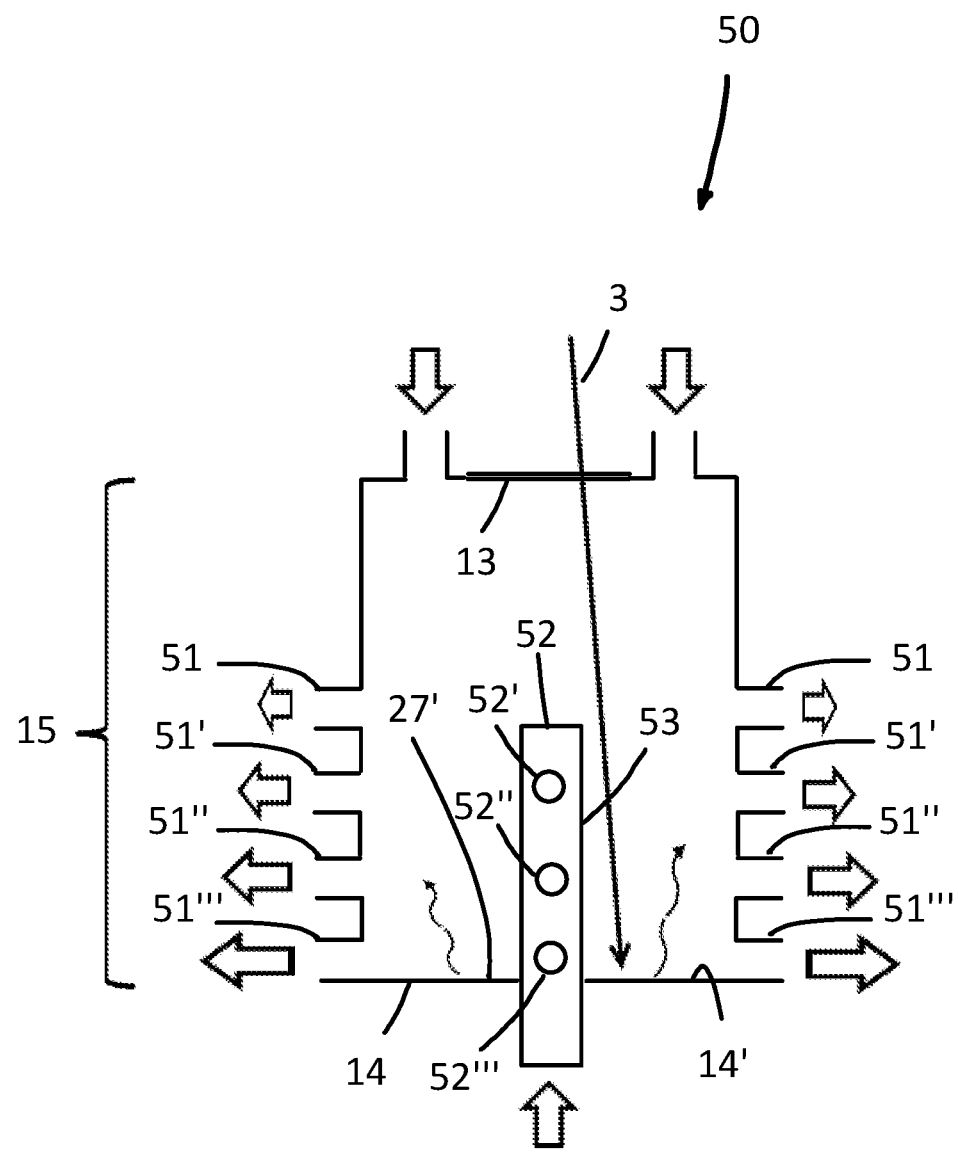
Figure 5B:
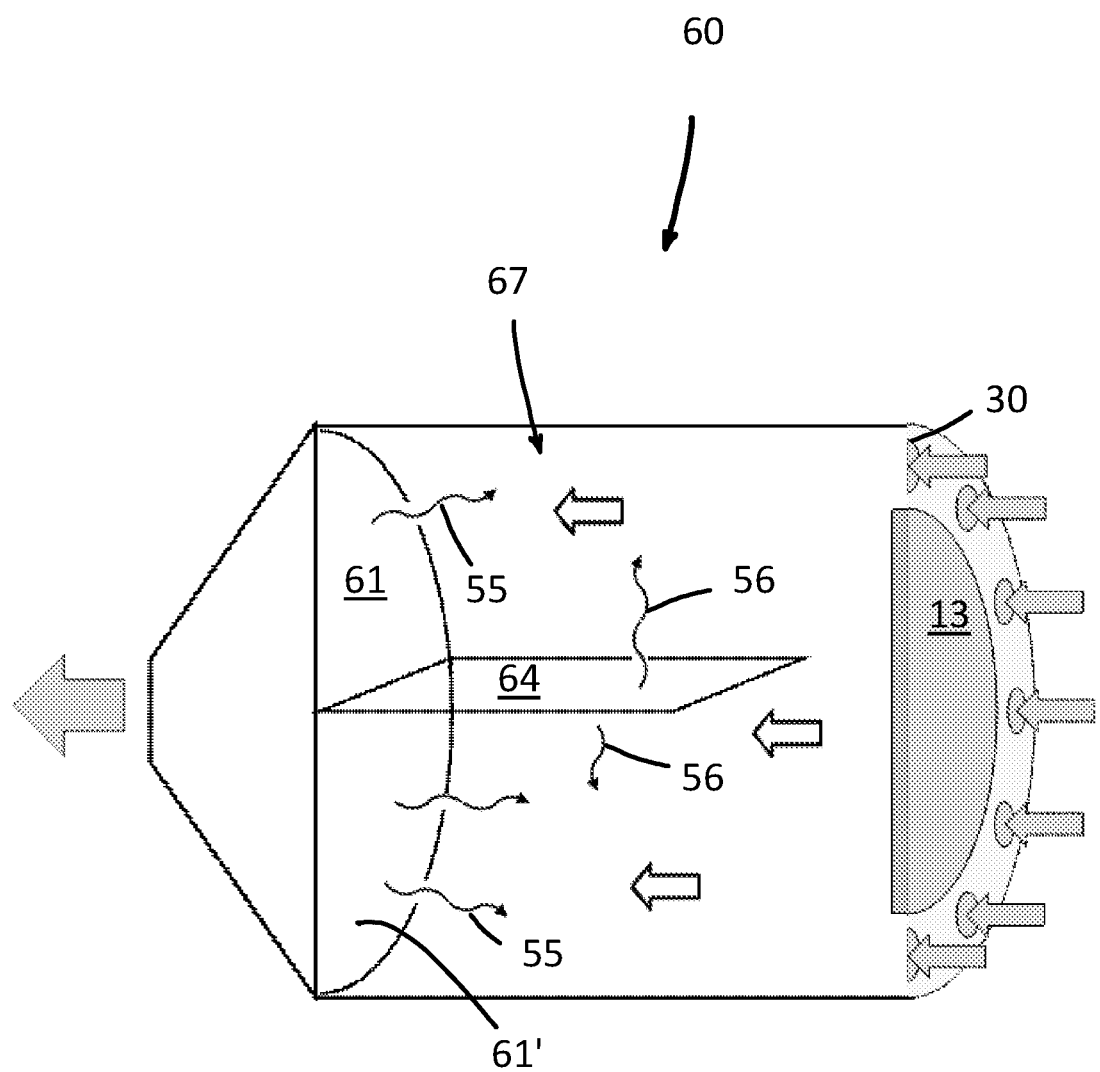
Figure 5C:
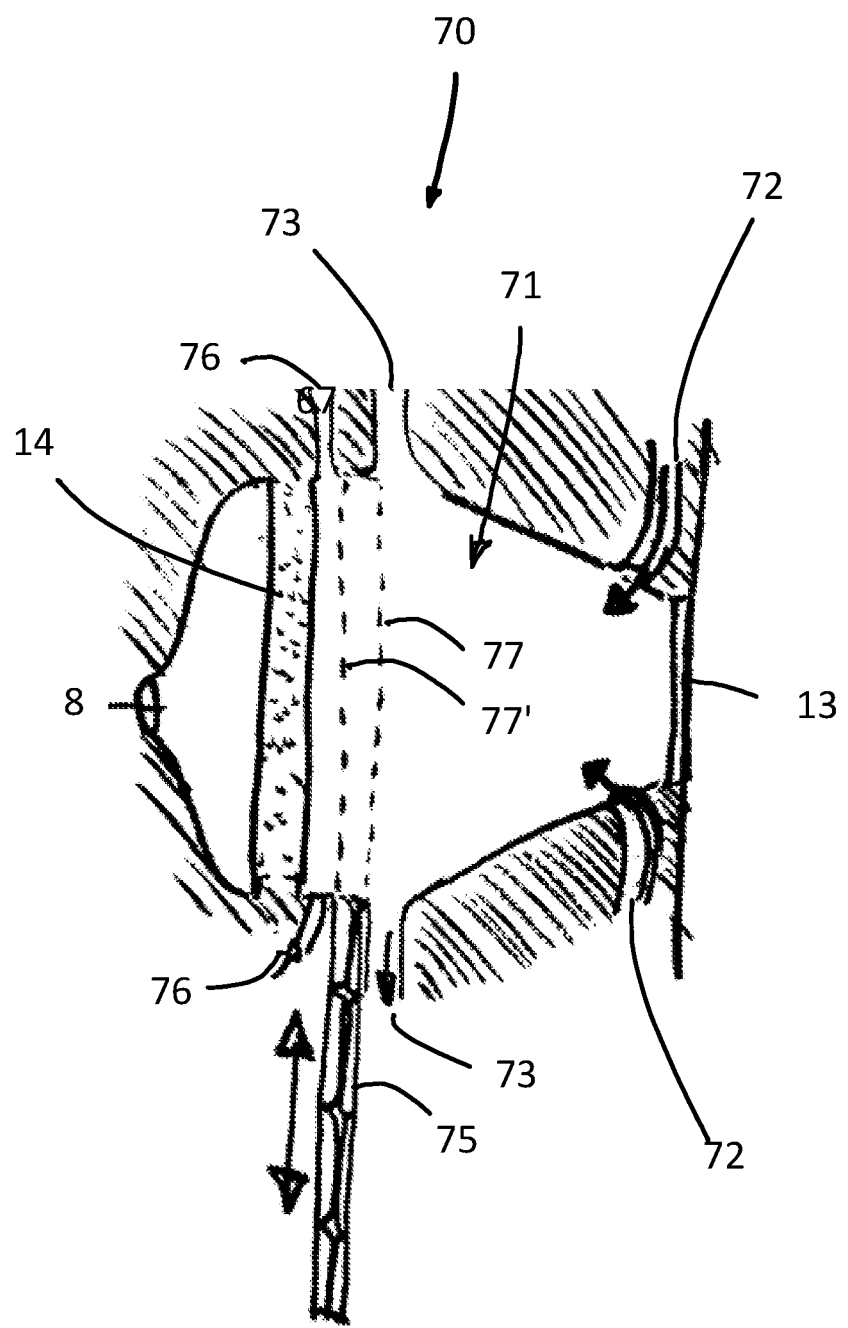
Figure 5D:
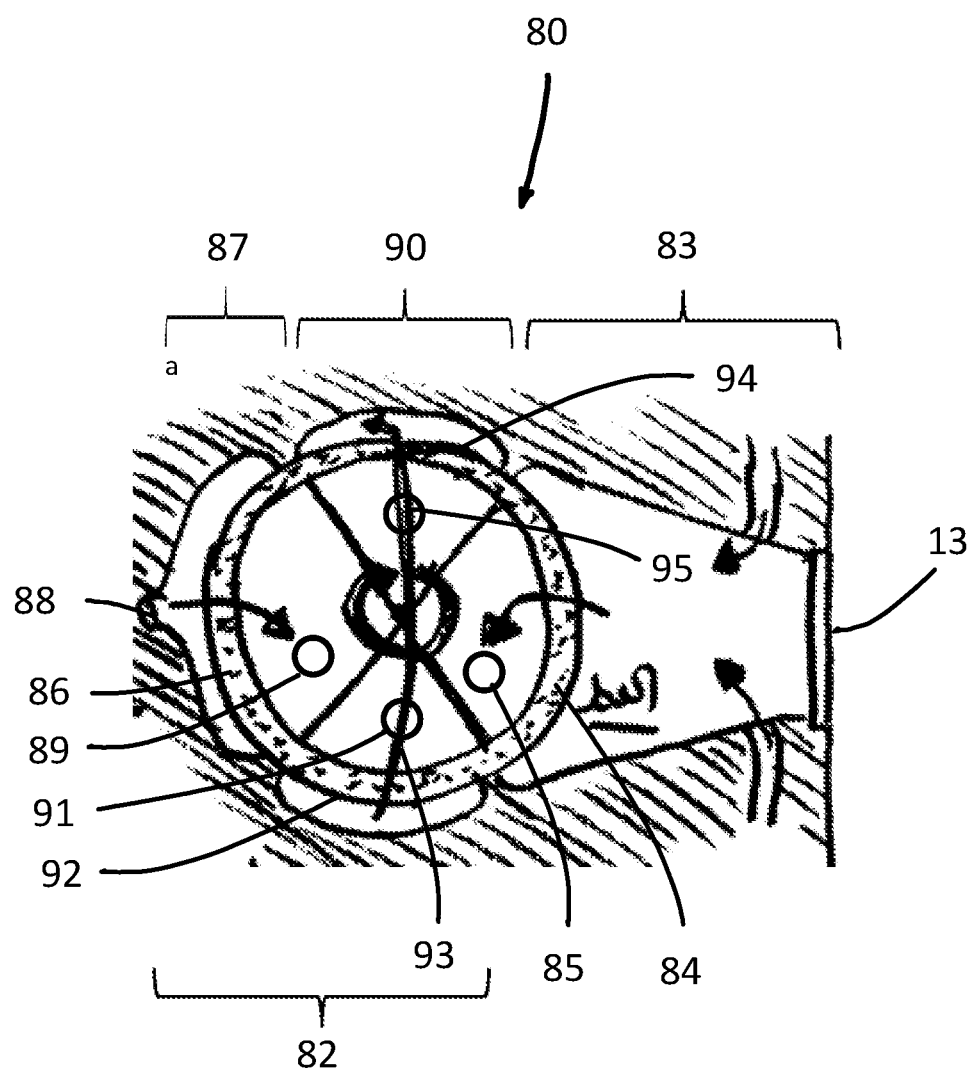

The invention will be described in greater detail in the following with the aid of the figures, which show:

FIG. 1a shows schematically a solar tower power plant with an embodiment of the receiver-reactor according to the invention, FIG. 1b shows schematically the solar tower power plant of FIG. 1a with a further embodiment of the receiver-reactor according to the invention, FIG. 2a shows schematically the structure of the receiver-reactor according to the invention, wherein the absorber area is configured as a reactor area, FIG. 2b shows a graph with the residual radiation losses of a receiver-reactor according to FIG. 2a, FIG. 3a shows a graph with operating temperatures of an illustrative syngas production of a receiver-reactor according to FIG. 2a, FIG. 3b shows a graph with the temperature of the absorber of a receiver-reactor according to FIG. 2a as a function of the outlet temperature of the heat-transporting fluid, FIG. 3c shows a graph with the temperature of the heat-transporting fluid during the operation of the receiver-reactor according to FIG. 3a, FIG. 4a shows schematically a longitudinal section through a receiver-reactor according to the invention, wherein the absorption area is separate from the reactor area, FIG. 4b shows schematically a cross-section through the receiver-reactor of FIG. 4a, wherein the absorption area is separate from the reactor area, FIG. 5a shows schematically a modified receiver-reactor for use with partially heated heat-transporting fluid, FIG. 5b shows schematically yet a further embodiment of the receiver-reactor according to the invention with a secondary absorber, FIG. 5c shows schematically yet a further embodiment of the receiver-reactor according to the invention, FIG. 5d shows schematically yet a further embodiment of the receiver-reactor according to the invention.

FIG. 1a shows schematically a solar tower power plant 1, with a field of heliostats 2, which deflect in a known manner rays 3 of the sun in concentrated form onto a receiver-reactor 4 according to the invention, which in turn is arranged on a tower 5. The resulting heat occurring in the receiver-reactor 4 that is currently not exploitable or required for the redox reaction taking place within it is guided in accordance with the invention via an absorptively heated heat-transporting fluid with a (higher) temperature $T_O$ via a line 6 to a consumer 7 (which is simply called heat exchanger in the following), where it cools before then being guided via a line 8 with a (lower) temperature $T_{in}$ in the circuit back to the receiver-reactor 4.

FIG. 1a shows a first embodiment according to the invention in which the absorptively heatable heat-exchanging fluid is simultaneously a gas that takes part in the redox reaction, which thus potentially contains syngas components downstream from the reactor. These syngas components are accordingly also guided as reaction products in the line 6 to a separation station 9, where they are separated from the heat-transporting fluid for further use. A solar reactor-receiver thus results in which the circuit line arrangement 6, 8 further includes a separation station 9 configured to separate syngas from the heat-transporting fluid and remove the same from the circuit.

FIG. 1b shows a second embodiment according to the invention, wherein the absorptively heated heat-exchanging fluid and the gas or gases which participate in the redox reaction are guided in separate line arrangements: in addition to the circuit for the heat-transporting fluid constituted by the lines 6 and 8 together with the heat exchanger 7, further lines 10, 10' for the transport of gases participating in the redox reaction are provided, said gases being processed in a processing unit 11 to be rendered serviceable so that the syngas can be extracted in the processing unit 11.

Both embodiments (FIGS. 1a and 1b) share the characteristic that heat that is not consumed by the redox reaction in the receiver-reactor is captured in an absorptive manner and guided to a consumer or heat exchanger 7. This heat can consequently be extracted by means of a very simple design and used as desired. In the case of the redox process described in the following, in which the reactor oscillates between a lower oxidation temperature $T_{ox}$ and an upper reduction temperature $T_{red}$, this heat can be used, inter alia, for increasing the temperature to the reduction temperature.

FIG. 2a shows schematically the structure of a receiver-reactor 4 according to the invention configured as a spatial receiver.

The receiver-reactor 4 includes a heating area 12, with an optical aperture 13, for example a quartz window, and an absorber 14, wherein, between the quartz window 13 and the absorber 14, an absorption area 15 is provided, through which the heat-transporting medium flows from right to left in accordance with the illustrated arrows, i.e. toward the absorber 4. To this end, the transport apparatus 16 includes inlet nozzles 17 for heat-transporting medium with the temperature $T_{in}$ arranged around the quartz window 13 (and connected to the line 8, cf. FIG. 1), said inlet nozzles 17 leading into the absorption area 5, and a central outlet nozzle 8 for heat-transporting medium with the temperature $T_O$ arranged behind the absorber 4 (the nozzle leading into the line 6, cf. FIG. 1).

The absorber 14 is configured in accordance with the invention as a reactor element by means of which the depicted arrangement is converted from a receiver into a receiver-reactor, i.e. an arrangement in which concentrated solar radiation, for example, from a solar tower power plant is used for carrying out a redox reaction under the conditions described in the following, here preferably the production of syngas.

For this purpose, the absorber 4 configured as a redox reactor includes a reducible and oxidizable material for a reduction and oxidation process, preferably $CeO_2$, which can be respectively reduced at higher temperatures and oxidized in the presence of an oxidizing gas. Other materials such as, for example, cerium dioxide ($CeO_2$), doped $CeO_2$ or perovskite can be specified by one skilled in the art for specific cases.

The absorber 14 is further configured as a black-body radiation arrangement according to the invention, i.e. it has a surface 14' arranged in the path of the incident solar radiation 3 which absorbs this radiation and which is configured in a such a manner that the absorber 14 is heated to a serviceable temperature as a result of the incident solar radiation 3 striking its surface 14' and subsequently emits corresponding black-body radiation (essentially infra-red radiation) via its surface 14' into the absorption area 15, cf. also the description below in this regard. The term black-body radiation is used here to designate radiation emitted by the absorber 14 as a result of its temperature, as opposed to sunlight 3 reflected by the same. The temperature of the absorber 14 is greatly increased through the absorption of the sunlight 3 and can lie in a range of, for example, 1000 K to over 2000 K, depending on the design of the receiver-reactor 4 in the specific case and on the materials used. In principle, however, the operating-temperature range of the receiver-reactor does not have an upper limit, but rather depends on the desired temperatures and available materials. $CeO_2$ has the advantage that it already exhibits a high degree of absorption in a slightly reduced state and can thus be readily heated by the solar radiation.

The absorber 14 thus emits its heat output in the form of black-body radiation (infra-red radiation) into the absorber area 15, provided that it is not consumed for the endothermic reaction of the reduction and formation of syngas during oxidation. The energy that is accordingly required is supplied by the solar radiation 3.

A gas or gas mixture that absorbs infra-red radiation is further used as the heat-transporting medium, said gas or gas mixture absorbing the black-body radiation of the absorber 4 while in the heating area 12 and being heated accordingly with regard to $T_{out}$. A heteropolar gas, preferably one of the gases $CO_2$, water vapour, $CH_4$, $NH_3$, CO, $SO_2$, $SO_3$, HCl, NO and $NO_2$ or a mixture thereof can be used as the infrared-absorbing gas.

The use of such gases ultimately results in a greenhouse effect that can be utilized or is utilized by the receiver-reactor according to the invention, as these gases are highly transparent for visible light, which thus substantially reaches the absorber, yet slightly to hardly transparent for the infra-red radiation of the absorber, so that they are thus heated absorptively to $T_{out}$ before reaching the absorber. It is noted here that real gases do not absorb visible light or infra-red radiation equally across all frequencies nor are they equally transparent for visible light or infra-red radiation across all frequencies, but rather that these characteristics vary considerably in particular in frequency bands specific to a gas. Moreover, absorption decreases with increasing distance from the source of radiation. The characterizations "highly transparent" and "slightly to hardly transparent" are consequently used in the foregoing in relation to the absorption and transparency of radiation.

A decisive parameter is thus the absorptivity a of the heat-transporting gas, which can be measured by means of experimentation, calculated from spectral line values from molecular spectroscopic databases (e.g. HITEMP2010) or determined approximately from emissivity charts in accordance with Hottel's rule.

It is noted here that, in addition to the visible light with no infra-red frequencies, the sunlight naturally also includes such infra-red frequencies. These infra-red frequencies are absorbed in accordance with the invention directly by the heat-transporting fluid in the absorption area, their energy thus being utilized with essentially no losses, as the back radiation is in turn absorbed by the following incoming fluid.

Finally, in addition to the use of an infrared-absorbing gas or gas mixture, the absorption area 15 is configured and the mass flow of the heat-transporting medium is determined in a such a manner that preferably essentially the entire black-body radiation of the absorber 14 is absorbed by the heat-transporting medium, i.e. in such a manner that the back radiation of the absorber 14 through the aperture 13 is essentially absorbed by the gas.

The back radiation of the absorber 14 is the black-body radiation of the same that lies on a path running through the aperture 13 and that is consequently—if it is not absorbed—radiated into the surrounding area, thus reducing the efficiency of the receiver-reactor. In accordance with the invention, a special zone, the absorption area 15, is created in combination with the absorber configured as the reactor in order to eliminate these losses in efficiency within the framework of a viable geometry for a receiver-reactor. The path running through the aperture does not have to lie in a straight line, but rather also comprises black-body radiation of the absorber 14 reflected by the walls of the absorption area.

An absorption of back radiation of the absorber 14 in accordance with the invention presupposes, first, that the absorption area 15 is long enough and, second, that the mass flow of the heat-transporting fluid is sufficient to maintain a temperature profile in the absorption area 15 so that the temperature at the site of the aperture is only marginally over $T_{in}$, which would no longer be the case after a period of time, for example, in the event of a standstill of the heat-transporting fluid.

FIG. 2b shows a graph 16 with the outlet temperature $T_{out}$ of the heat-transporting gas on the horizontal axis and the percentage of the black-body radiation of the absorber 14 exiting the aperture 13, i.e. the undesirable back radiation, on the vertical axis. If the aperture 13 includes a window, e.g. made of quartz glass, the back radiation is indicated by the curve 17; without a window, it is indicated by the curve 18. The curves 17 and 18 are the result of a simulation, cf. the following description relating to FIGS. 3a to 3c in this regard, i.e. they are valid for an absorption area 15 with a diameter and a height of respectively 15.95 m, as potentially suitable for a heliostat field.

One skilled in the art can determine the geometry of the absorber area in accordance with the specific case so that there is essentially no residual back radiation (which, however, could potentially lead to an absorption area of a length that is disadvantageous under other aspects) or so that the residual back radiation is slightly increased if a particularly compact design is desired, wherein in this case 80% or more or 90% or more of the black-body radiation of the absorber can still be absorbed.

It follows that, preferably, the heat-transporting fluid is composed and the transport device and the absorber area are configured in such a manner that, during the operation of the reactor, the heat-transporting fluid absorbs ≥80%, preferably ≥90% and most preferably ≥94% of the black-body radiation of the absorber present on a path through the aperture for the radiation of the sun.

Three advantages result from this use of an infrared-absorbing gas:
First, radiation losses from the optical aperture due to back radiation of the black-body radiation are predominantly or essentially completely avoided according to the invention. This back radiation reduces the efficiency of a conventional receiver (and thus of a receiver-reactor) appreciably.

Second, the heat of the black-body radiation of the absorber can be utilized directly in the heat-transporting fluid and is available for a flexible usage, cf. also the following description in this regard.

Third, the heating of the heat-transporting medium to $T_{out}$ requires neither significant expenditure in terms of design nor a toleration of corresponding flow losses, as is the case with conventional receivers working predominantly by convection. The corresponding problems (constructional expenditure, flow losses) in volumetric receivers with spatially configured absorbers with a complex structure do not apply. This applies in particular with regard to the absorption area, as, for a black-body radiation into the absorption area that is as intensive as possible, high temperatures of the absorber as well as of the side walls of the absorption area are advantageous so that no cooling means of any kind is required there, in particular cooling channels as provided in receivers according to the prior art—either cooling channels in the walls or cooling channels in the absorber ensuring a maximum convection.

The walls of the absorption area 15 and/or the absorber 14 are free of any cooling means activated during normal operation, in particular free of cooling channels. Emergency cooling means for an extraordinary operating state can naturally still be provided in accordance with the invention at any point on the receiver-reactor so as to protect the same from a forbidden operating state.

The heat-transporting medium present in the area of the optical aperture 13 has the temperature $T_{in}$ and thus generates a black-body radiation of its own through the optical aperture. However, compared to the back radiation of the absorber 14, this back radiation is of minor significance, as black-body radiation is proportional to the $4^{th}$ power of the temperature. The black-body radiation of the absorber 14 through the optical aperture would thus generate significantly higher radiation losses, which, however, is not the case according to the invention.

In the embodiment depicted in FIG. 2a, the heat-transporting fluid flows through the absorber 14 so that it is also heated somewhat convectively following the absorptive heating in the absorption area 15. It follows that the absorber is preferably configured to allow a flow of heat-transporting fluid through it and the surface of the area of flow in this case further preferably consists at least partially of a reducible/oxidizable material. Consequently, in the depicted embodiment, the absorbing gas is guided through the absorber during the reduction process and during the oxidation process, preferably in such a manner that it is also heated there convectively. This arrangement has the advantage that, first, and as mentioned above, there is no back radiation of the absorber 14 through the aperture 13 and, second, the absorber 14 can be designed for a convective heat transfer to the heat-transporting medium provided that it can be readily cooled via the mass flow of the heat-transporting medium from the upper reduction temperature $T_{red}$ to the lower oxidation temperature $T_{ox}$ (cf. the following description in this regard)—wherein the absorber 14 can still be configured in a simple manner and with low flow losses. In an embodiment not depicted in the figures, one skilled in the art can also provide for a specific case that the heat-transporting fluid is guided through the absorber for oxidation (i.e. in the phase of the redox cycle during the decrease in absorber temperature) under convection and past the absorber, for example through the outlet lines 51''' in accordance with FIG. 4), for reduction (i.e. in the phase in the redox cycle during the increase in absorber temperature). The absorber thus cools readily for oxidation and is respectively readily heated with a view to reaching the reduction temperature.

The heat-transporting fluid thus has the temperature $T_{in}$ at the inlet nozzles 17, the temperature $T_{out}$ after the absorptive heating in the absorption area 15 and the slightly higher temperature $T_O$ after the outlet nozzle.

In other words, in the arrangement shown in FIG. 2a, the reducing/oxidizing material is arranged on the side facing the absorption area so that the absorption area simultaneously becomes the reactor area in which the redox reaction takes place. It follows that an at least oxidizing gas, preferably water vapour or $CO_2$, is preferably used as the infrared-absorbing gas, said gas being guided through the absorption chamber to the absorber so as to participate in the redox reaction in the absorption chamber and undergo reduction by the absorber in the oxidation phase. In accordance with the preceding description relating to FIG. 1a, the at least oxidizing gas is preferably guided downstream from the absorber into a separation station, in which syngas is separated from the same, wherein the oxidizing gas is preferably guided in the circuit back to the absorber chamber, during which time it is cooled in this circuit in a heat exchanger before the absorber in the direction of flow.

It is further also possible, as described in the foregoing, to provide the flow openings of the absorber as well as, depending on the specific case, the rear side of the absorber with the reducible/oxidizable material so that the area behind the absorber up to the outlet nozzle becomes a reaction area.

The oxidation phase of the redox reactor described above necessarily precedes the reduction phase, which for its part is facilitated when an infrared-absorbing gas with a low partial pressure of oxygen is used, as then the reduction of the redox reactor takes place with a greater intensity at a given temperature, which in turn increases the efficiency of the arrangement. Preferable infrared-absorbing gases used during at least the reduction phase of the redox reactor are water vapour and $CO_2$ or other gases or gas mixtures the partial pressure of oxygen of which is equal to or lower than that of water vapour or $CO_2$ at the temperatures provided for reduction. It follows that a gas whose partial pressure of oxygen at a temperature prevailing during the reduction phase of the redox reactor is equal to or less than the higher value of the partial pressure of oxygen of water vapour or $CO_2$ at this temperature is preferably used as the infrared-absorbing gas, wherein this gas is guided at least during the reduction phase (through the circuit line arrangement) through the absorption chamber to the absorber in such a manner that the absorber is reduced in the reduction phase in the presence of this gas. The reduction consequently takes place readily due to the low partial pressure of oxygen, i.e. at a lower temperature for a given degree of reduction than would be the case with a gas with a higher partial pressure of oxygen.

These embodiments share the characteristic that the heat-transporting fluid is a gas that is reducible during the oxidation of the absorber, wherein the reducible/oxidizable material of the absorber is arranged on the latter so as to lie in a serviceable state in the flow path of the heat-transporting fluid so that it is reduced in the oxidation phase of the redox reactor.

With the aid of the graphs depicting simulations of the applicant shown in FIGS. 3a to 3c, the operation of the receiver-reactor according to the invention is described in greater detail using the example of an embodiment in accordance with FIG. 2.

The simulation is based on the following data:

Length and diameter of the absorption chamber 15 are both 15.96 m. A sufficient length of the absorption chamber for an almost entire absorption of the blackbody radiation of the absorber is thus provided. The absorber can be configured, for example, as a simple plate in this case so that the receiver-reactor can be readily manufactured as a low-cost solution in terms of its design. In this case, the surface of the absorber radiating into the absorption area preferably includes a reducible/oxidizable material.

The diameter of the optical aperture 13 is 11.28 m, which is thus suitable for receiving the radiation of the field of heliostats 2 (FIG. 1), yet with a surface area of 100 m² that is only half as large as the surface area of 200 m² of the absorber 14 so that the back radiation of the heat-transporting fluid with the temperature $T_{in}$ is also reduced accordingly.

The absorber 14 is made of $CeO_2$; the weight of the receiver-reactor is 144 t. The radiation flux is 1200 kW/m² through the optical aperture 13 and 600 kW/m² at the absorbing surface 14' (which has double the surface area in comparison with the aperture 13).

Water vapour is used as the heat-transporting and infrared-absorbing fluid, wherein its temperature $T_{in}$ is 1000 K. This temperature is illustrative of an industrial process associated with the receiver-reactor taking place at, for example, 900 K, cf. the consumer 7 of FIG. 1. The temperature $T_{out}$ of the water vapour at the absorber is 1800 K with regard to the upper reduction temperature $T_{red}$ of the absorber 14 required for the redox reaction (cf. also the following description relating to FIG. 3a in this regard).

In principle, the redox reaction at the reactor takes place in a manner that the absorber 14 is increasingly reduced with increasing temperature (i.e. it loses oxygen), wherein the extent of the reduction depends on the temperature of the absorber 14 and the partial pressure of oxygen prevailing therein. The equation $CeO(2-\delta_{ox}) \rightarrow CeO(2-\delta_{red})+(\delta_{red}-\delta_{ox})O$ applies for the reduction, as the absorber 14 does not release the oxygen stoichiometrically. In principle, the reduction could take place in a vacuum, although in the presence of water vapour here, which prevents the back radiation of the absorber 14 through the optical aperture 13 and removes the oxygen $(\delta_{red}-\delta_{ox})O$ from the reactor-receiver, for example to the separation station 9.

The absorber 14 is increasingly oxidized with decreasing temperature (i.e. it absorbs oxygen), wherein the extent of the oxidation again depends on the temperature of the absorber 14 and the partial pressure of oxygen prevailing therein. The oxygen supplier is the heat-transporting fluid, i.e. the water vapour here (the oxygen released during reduction has been purged from the receiver-reactor). The equation $CeO(2-\delta_{red})+(\delta_{red}-\delta_{ox}) H_2O \rightarrow CeO(2-\delta_{ox})+(\delta_{red}-\delta_{ox}) H_2$ applies for the oxidation, as the absorber 14 does not absorb the oxygen stoichiometrically. $H_2$, i.e. hydrogen, is thus formed, which is in turn removed by the heat-transporting fluid to the separation station 9 (FIG. 1), in which it is separated before being provided as syngas.

The non-stoichiometric 6 here indicates the amount of oxygen lost each time by the $CeO_2$ and thus the respective "reduction state" or "oxidation state", which, as already mentioned, depend on the partial pressure of oxygen and the temperature. Under the aspect of a specific redox process, there is a reduction state when δ is larger and an oxidation state when δ is smaller.

FIG. 3a shows a graph 20 for an operation of the receiver-reactor 1 with the data indicated above. The partial pressure of oxygen is plotted logarithmically on the vertical axis; the temperature of the absorber 14 including a reducible/oxidizable material, the absorber 14 here consisting of $CeO_2$, is plotted on the horizontal axis.

One embodiment of the redox process in a receiver-reactor according to the invention is based on the assumption of a sufficient reduction of the cerium oxide ($CeO_2$) of $\Delta\delta=\delta_{red}-\delta_{ox}=0.06$, wherein $\delta_{ox}=0.04$ and $\delta_{red}=0.1$ here. The curve 21 shows when, as a function of temperature and partial pressure of oxygen, $\delta_{red}=0.1$. The curve 22 shows when, as a function of temperature and partial pressure of oxygen, $\delta_{ox}=0.04$. The curve 23, in turn, shows the partial pressure of oxygen of water vapour as a function of temperature.

The point of intersection 24 of the curves 21 ($\delta_{red}=0.1$) and 23 (water vapour) determines the upper absorber temperature $T_{red}$ for the reduction, while the point of intersection 25 of the curves 22 ($\delta_{ox}=0.04$) and 23 (water vapour) determines the lower absorber temperature $T_{ox}$ for the oxidation. The arrow 26 thus shows the temperature interval to be realized at the absorber 14 for the desired redox process, which produces hydrogen here. This interval is advantageously small, approx. 200 K, as high operating temperatures can be managed without any problem with the arrangement according to the invention. It is noted here that this interval becomes increasingly smaller at even higher temperatures. Through its design, the receiver-reactor according to the invention is suitable for operation in such high temperature ranges, the temperature resistance of the materials selected in the specific case by one skilled in the art permitting.

FIG. 3b shows a graph 30 for increasing the temperature of the absorber 14 to the upper reduction temperature $T_{red}$. The temperature $T_{out}$ of the heat-transporting fluid is plotted on the horizontal axis, while the temperature of the absorber 14 reachable as a consequence is plotted on the vertical axis. It is noted here that the reachable temperature of the absorber is only slightly dependent on $T_{out}$ of the heat-transporting fluid, which allows a flexible alignment of $T_{out}$ with the external consumer (i.e. an adjustment of $T_{out}$ to the needs of the consumer), wherein the temperature of the absorber/reactor changes to a much smaller extent than $T_{out}$. A desired reactor activity can thus be maintained even when $T_{out}$ fluctuates according to demand.

In the present example embodiment, the inlet temperature $T_{in}$ of the water vapour entering the reactor-receiver 4 is 1000 K, cf. above. The outlet temperature $T_{out}$ can be controlled via the mass flow of the heat-transporting fluid through the absorption area 15. The curve 31 thus shows via the dot 31' that the upper temperature $T_{red}$ for the reduction of the absorber 14, here 2058 K (cf. the graph 20, FIG. 3a), is reached at a temperature of the water vapour of $T_{out}$ of approx. 1750 K. As the graph shows a state of equilibrium only reached after a long time, a temperature $T_{out}$ of approx. 1800 K is provided in order to achieve an industrially viable cycle time.

It is noted here that, for the lowering of the absorber temperature to $T_{ox}$, an increase of the mass flow is sufficient, whereupon a convective cooling of the absorber by the heat-transporting fluid sets in and the absorptive heating thus decreases accordingly, so that the lower temperature $T_{ox}$ is reached via the slightly increased convective cooling without the heat-transporting fluid having to reach the temperature of $T_{out}$=approx. 1800 K.

FIG. 3c finally shows a graph 40, on the horizontal axis of which the height of the receiver-reactor 4 is plotted (the origin is located in the optical aperture 13, the maximum height of 15.95 m at the absorber 14). The temperature of the heat-transporting fluid (here water vapour) flowing through the absorption area 15 from the aperture 13 to the absorber 14 is plotted on the vertical axis. The curve 41 here shows a temperature drop of the water vapour from 1800 K at the site of the absorber 14 back (contrary to the direction of the mass flow) to the aperture 13, where the temperature is 1000 K, i.e. $T_{in}$. In other words, the black-body radiation of the absorber 14 is predominantly absorbed in the case of an outlet temperature of the water vapour of 1800 K (upper reduction temperature $T_{red}$), i.e. the corresponding heat losses have been eliminated, cf. also the graph 16 shown in FIG. 2b in this regard. This absorption rate naturally also applies when the temperature at the absorber is less than 1800 K, which is the case when the absorber temperature is lowered toward the oxidation temperature.

In other words, FIGS. 3a to 3c show a proof of concept of the aforementioned advantages of the reactor-receiver according to the invention.

In summary, this results in a method for producing syngas by means of solar radiation, in which the reactor of a receiver-reactor is periodically heated via an aperture provided in the same for solar radiation by means of the solar radiation to an upper reduction temperature for a reduction process and subsequently cooled to a lower oxidation temperature for an oxidation process in the presence of an oxidation gas, wherein the sunlight is guided through an absorption chamber onto an absorber configured as a reactor, the absorber including a reducible/oxidizable material, and wherein a gas that absorbs the black-body radiation of the absorber is guided through the absorption chamber and the absorption chamber is configured so that 80% or more of the black-body radiation present on a path to the aperture (the back radiation of the absorber) is absorbed by the gas.

This results further in a solar receiver-reactor with an aperture for the radiation of the sun, an absorber arranged in the path of the incident light, a reactor for a redox reaction and a transport arrangement in which a gas that participates in the redox reaction is guided in a serviceable state to the reactor and away from the same, wherein the absorber is configured as a reactor, an absorber chamber is arranged between the aperture for the radiation of the sun and the absorber in the path of the incident light and black-body radiation of the absorber, and wherein the transport arrangement has a circuit line arrangement in which a heat-transporting fluid circulates, wherein the circuit line is configured in such a manner that the heat-transporting fluid can be charged with heat in the absorber chamber and cooled again in the heat exchanger, wherein the heat-transporting fluid is an IR gas that absorbs the black-body radiation of the absorber on a path running through the aperture.

Moreover, this results in a solar receiver-reactor with an aperture for the radiation of the sun, an absorber arranged in the path of the incident light and a transport arrangement for the heat-transporting fluid that cools the absorber, configured in such a manner that an absorption area is provided in the path of the light before the absorber and the transport arrangement is further configured to guide the heat-transporting fluid through the absorption area in such a manner that it is heated by the black-body radiation of the absorber, wherein the absorber includes a reducible/oxidizable material for a reduction process and for an oxidation process and the heat-transporting fluid includes a gas that absorbs in the frequency bands of the infra-red range, the gas being composed and the transport device and the absorber area being configured in such a manner that, during the operation of the reactor, the heat-transporting fluid essentially absorbs the back radiation of the absorber through the aperture, and wherein the receiver-reactor is configured in such a manner that the temperature of the reducible/oxidizable material of the absorber can be alternately brought back and forth between an upper temperature $T_{red}$ and a lower temperature $T_{ox}$.

FIG. 4a shows schematically a further embodiment of the receiver-reactor 100 according to the invention in a longitudinal section through a diameter of the absorption area 101, which has a front, cylindrical section 102 in the direction of the sunlight and a rear, conical section 103. An absorber 104 consists of at least one and preferably of a bundle of tubes 105, on the inner wall of which a reducible/oxidizable material is arranged. These tubes 105 guide a gas that participates in the chemical reaction, here the redox reaction—i.e. an at least oxidizing gas that loses O atoms during the oxidation of the absorber (i.e. its inner coating) and is thus (partially) reduced to syngas. The solar radiation heats the absorber 101, which in turn releases its black-body radiation into the absorption area 101, wherein the infrared-absorbing gas flowing through the absorption area 101 (arrows 106) absorbs this radiation as described and is heated in the process.

It is noted here that the at least oxidizing gas can also be used during the reduction phase, in which case it absorbs and carries off O atoms; as a consequence, a corresponding separation station must be provided to remove the O atoms from the gas before the oxidation of the absorber, as otherwise syngas will not be formed in the subsequent oxidation phase. Alternatively, it is in principle also possible to use different gases for the oxidation and for the reduction, which can be advantageous in specific cases. It is further possible to carry out the reduction under a vacuum so that the oxygen released during the reduction is present in a pure form and a separation from a gas flow is thus not necessary. Moreover, the degree of reduction $\delta_{red}$ can be increased at a given reduction temperature $T_{red}$ by decreasing the partial pressure of oxygen during the reduction phase, whereby more syngas can be produced in the subsequent oxidation phase, thus increasing the efficiency of the redox process.

It follows that the absorber is preferably configured as a section of the further line arrangement and that it includes at least one line for the at least oxidizing gas, on the inner wall of which a reducible/oxidizable material is arranged. The absorber is further preferably configured as a tube bundle for at least oxidizing gas.

The end of the receiver-reactor 100 in which the infrared-absorbing gas enters can be configured in an identical manner as the end of the receiver-reactor 4 (FIG. 2). The end of the receiver-reactor 100 that includes the absorber 104, on the other hand, is modified as described above, wherein the absorber 104 is configured as a bundle of tubes 105. This renders possible a separation of the gas participating in the redox reaction from the heat-transporting fluid, wherein in this case the absorption area 15 (FIG. 2) is no longer the reaction area for the redox reaction, which is now the inside of the tubes 105.

The heat-transporting fluid escapes laterally via openings 108 (arrows 110), enters into a collector 109 and is finally guided in the line 8 to the heat exchanger 7 (FIG. 1b), from where it is then guided in the circuit back to the reactor-receiver 100. Alternatively, the heat-transporting fluid could, for example, also be guided between the tubes 105 of the absorber 104 during oxidation in order to additionally cool the absorber convectively to a lower oxidation temperature $T_{ox}$ before being introduced into the line 8 via a collector not illustrated here.

The gas participating in the redox reaction is transported back and forth between the absorber 100 and the processing station 11) via the lines 10, 10' as depicted in FIG. 1*b*.

FIG. 4*b* shows schematically the embodiment of the receiver-reactor 100 according to the invention shown in FIG. 4*a* in a view from above, corresponding to the plane A-A indicated in FIG. 4*a*. The rows of openings 108 for the heat-transporting fluid arranged on both sides of the absorber 104 (which consists of a bundle of tubes 105) are evident, the heat-transporting fluid reaching the line 8 (FIG. 1*b*) via the only partially visible collector 109 (the collector 109 being covered by the section 103). By means of the oblique configuration of the lower section 103 of the absorption area 101, the pipes 105 in the same are approximately of the same length so that the gas participating in the redox reaction flowing in them is heated approximately uniformly. Its direction of flow is indicated by the arrows 111.

It follows that, after absorbing the black-body radiation of the absorber, the absorbing gas is preferably removed as the heat-transporting fluid from the receiver-reactor without participating in the redox reaction and that an at least oxidizing gas is fed to the absorber for the redox reaction separately from the absorbing gas. The at least oxidizing gas is further guided through the absorber, which is preferably configured by a tube bundle for the oxidizing gas. The receiver-reactor in this case further includes a line arrangement for at least oxidizing gas, which guides the same separately from the heat-absorbing heat transfer gas.

In an embodiment not depicted in the figures, the at least oxidizing gas can be fed to the side of the absorber facing away from the absorption area, wherein the absorber can again be configured as a plate, which is then heated on its side facing the absorption area, radiates into the absorption area and includes on its other side the reducible/oxidizable material that reacts with the gas participating in the reaction. In this case, the absorber is preferably linked to the circuit line arrangement and to the further line arrangement for oxidizing gas and forms a partition between the flow path of the heat-transporting fluid and that of the oxidizing gas.

FIG. 5*a* shows schematically a modified receiver-reactor 50 for use with partially heated heat-transporting fluid. A cross-section through a further embodiment of a receiver-reactor 50 of the kind shown in FIG. 2 or FIGS. 5*a* and 5*b* is depicted schematically. The sun rays 3 fall through a window made of, for example, quartz glass 13, onto the absorber 14, the radiating surface 14' of which heats the gas flowing through the absorption area 15, wherein the temperature of the gas increases between the window 13 and the absorber 14. Accordingly, the gas can be removed as the partially heated heat-transporting medium via openings 51 to 51''' in the cylindrical wall of the receiver 50 at different temperatures that are greater than $T_{in}$. The arrows show the direction of flow of the heat-transporting gas, wherein the length of the arrows at the openings 51 to 51''' are depicted according to increasing temperature.

Alternatively—or together with the openings 51 to 51'''—a line 53 extending into the absorption area 15 can be provided for the gas, which in this case feeds in gas via openings 52 to 52''' at the temperatures prevailing at the site of the openings 52 to 52''', said gas also being partially heated and having a temperature prevailing in the interior of the absorption area 15 at the site of the openings. This is advantageous in particular when a downstream process occurring at different temperature levels is supplied with heat by the receiver-reactor 50. In this case, heat-transporting gas can also be guided at different temperatures from the process back to the receiver so that further supply lines for feeding the heat-transporting gas into the absorber area 15 of the receiver 50 are further preferably provided in the area of the openings 51 to 51''' and 52 to 52''' (which are omitted here for the sake of the clarity of the figure).

This results in a receiver in which the transport arrangement includes one or more lines 51 to 51''' and 52 to 52''' for heat-transporting gas, which are connected to the absorber area 26 and arranged in such a manner that partially heated gas can be removed from the absorber area 15 and/or partially heated gas can be supplied to the absorber area 15 at a site at which the temperature of the gas in the absorber area 15 essentially corresponds to the temperature of the partially heated, supplied gas.

Such supply and outlet lines for partially heated gas can be provided on an absorptive receiver-reactor according to the invention without having to modify its layout and in particular without having to modify the absorber 14—these lines can also be utilized or shut down without a modification of the design being required as a result of the different heat transfer.

FIG. 5*b* shows schematically a further embodiment of the receiver-reactor 60 according to the invention. Depicted is a section through a receiver-reactor 60 corresponding to the receiver-reactor 4 shown in FIG. 2, wherein, however, the absorber 61 with its absorbing surface 61' facing the optical aperture 13 includes a preferably plate-shaped section 64 extending into the absorber area 67, said section 64 extending in the middle of the absorber area 67 toward the aperture 13 and being oriented essentially parallel to the direction of flow, indicated by the depicted arrows, of the infrared-absorbing heat transfer gas. The section 64 essentially absorbs black-body (infra-red) radiation emitted by the absorbing surface 61' insofar as said radiation has not yet been absorbed by the gas flowing along it and consequently in particular radiation in the frequency bands for which the gas is less absorptive (cf. the above description relating to effective frequency bands in real gases). The section 64 is thus heated and in turn represents a black-body radiation arrangement, which on the whole radiates a black-body frequency spectrum corresponding to the temperature of the section 64 and heats the heat-transporting gas flowing past it in an absorptive manner. This results in an improved usage of the frequencies of the radiation 55 that are poorly absorbed by the gas, as these frequencies introduce heat into the section 64, which then in turn radiates in all (infra-red) frequencies. The section 64 represents a secondary absorber.

Such an arrangement can be realized with larger dimensions, e.g. with a diameter of the absorber surface 61' of 15.96 m and a length of the absorber area 67 (absorber surface 61' to optical aperture 13) of 15.96 m. The receiver 60 is then suitable for receiving the flux of a large number (or all) heliostats of a tower power plant. It follows that the receiver 60 includes an absorption area 67 and the absorber 61 extends with a section or secondary absorber 64 into this area, the section 64 preferably being configured in the shape of a plate. Preferably, the secondary absorber 64 can also be at least partially provided with a reducible/oxidizable material, which, however, can be different from the reducible/oxidizable material of the absorber 61 depending on the location of the secondary absorber, where in principle there are different temperature conditions than at the absorber 61.

In a further embodiment not depicted in the figure, a glass wall (quartz glass) transparent for, for example, the visible spectrum of the sunlight can be provided as a secondary absorber, which is arranged approximately in the middle between the absorber surface 61' and the optical aperture 13 parallel to the absorber surface 61' and which includes passages, for example in the manner of a perforated plate, for the heat-transporting gas. The glass wall is in turn heated by the infra-red radiation of the absorber surface 61' or by its frequency components not yet absorbed by the gas and radiates itself in the manner of a black body in both directions, namely both toward the optical aperture and toward the absorber. The result according to the invention is a receiver including a further secondary absorber configured as a black-body radiation arrangement with reduced convection in an absorption area located before the absorber, which is arranged and configured in such a manner that it can be heated by the infra-red radiation of the absorber and radiate itself during operation into the absorber area, wherein it is preferably configured to be plate-shaped and particularly preferably essentially does not overshadow the absorber.

FIG. 5c shows a further reactor-receiver 70 according to the invention, with an optical aperture 13 and an absorber 14, wherein the absorption area 71 is tapered in the shape of a cone in its longitudinal section and supply lines 72 with lateral infeeds for the heat-transporting fluid are provided. Outlet lines 73 for the absorptively heated heat-transporting fluid leading laterally away from the area are also provided. A sliding element 75 is further provided, which, in its open position depicted in the figure, is extracted from the absorption area 71 and does not interfere with the flux of the solar radiation onto the absorber 14 or the black-body radiation of the latter into the absorption area 71. This configuration is particularly suitable for the reduction of the absorber 14, i.e. in the phase of its heating from $T_{ox}$ to $T_{red}$.

If the sliding element 75 is brought into the closed position, which is indicated by the dashed lines 77, the absorber 14 is shielded from the radiation of the sun, which leads to a rapid cooling of the absorber 14 in the oxidation phase, i.e. from $T_{red}$ to $T_{ox}$. An oxidizing gas, for example $CO_2$, can then be guided by the supply lines 76 to the absorber 14 and oxidize the same before being guided via the outlet nozzle 8 to the separation station 9 (FIG. 1). This has the advantage that a larger portion of the gas can be guided through the absorber for the oxidation operation, which thus cools faster. It is further advantageous that the concentration of the syngas (here CO) in the gas guided to the separation station is high so that the separation can be performed efficiently. The oxidizing gas can also be guided through the transport arrangement of the receiver-reactor according to the invention separately from the heat-transporting fluid intended for an external consumer 7 (FIG. 1).

After oxidation, the sliding element (which is depicted here as a radiation barrier) is brought back into the open position. It follows that a radiation barrier is provided in a further embodiment, which can alternately be placed before the absorber in the path of the solar radiation and removed from the same.

In an embodiment not shown in the figures, a solar power plant includes at least two reactors according to the invention, which are operated in an offset manner in relation to one another in the cycle of reduction and oxidation, and the solar reflectors, preferably heliostats, are respectively directed toward the reactor in the reduction phase while the other reactor is not illuminated by the solar reflectors. By this means, a continuous stream of heated heat-transporting fluid and syngas is generated independently of the respective redox processes in the receiver-reactors even when different gases are used for the reduction and the oxidation (for example, water vapour for the reduction and $CO_2$ for the oxidation).

It is of course possible to use water vapour for the reduction, which has a lower partial pressure of oxygen at the prevailing high temperatures compared to $CO_2$ and is thus more conducive for reduction than $CO_2$, while $CO_2$ can be provided for the oxidation when a syngas component CO is to be produced. The receiver-reactor according to the invention can accordingly be operated with different heat-transporting fluids depending on how conducive these are in the specific case for the reduction or oxidation process. It follows that an oxidizing gas, preferably water vapour or $CO_2$, can also be used as an infred-absorbing gas and that the transport arrangement includes lines for feeding different gases into the absorber area, preferably in such a manner that one gas is supplied to the absorber area (or to the area behind the absorber) for a reduction process and another gas is supplied to the same for an oxidation process.

FIG. 5d shows a further reactor-receiver 80 according to the invention, with an optical aperture 13 and an absorber 81 with an annular structure consisting of segments, which is arranged in an area 82 for gradual rotation and delimits the same from the absorption area 83. Supply lines for heat-transporting gas with the temperature $T_{in}$ feed into the absorption area 83, said gas flowing after absorbing the black-body radiation of the absorber segment 84 with the temperature $T_{out}$ to and then through the segment 84 and exiting the receiver-reactor 80 via an outlet line 85 arranged perpendicularly to the plane of the drawing before being guided via the line 6 to a consumer 7 (cf. FIG. 1a). The segment 84 is heated accordingly, the absorber 81 remaining in this position until the segment 84 has reached the reduction temperature $T_{red}$.

At the same time, the segment 86 is located in an area 87 of the area 82 that is shielded from the solar radiation, wherein oxidizing gas is fed in by the supply line 88, which flows through the segment 86 that has cooled to the oxidation temperature $T_{ox}$ and is brought, charged with the syngas, to the separation station 9 (FIG. 1) via the outlet line 89. Reduction and oxidation thus take place simultaneously, wherein the same gas or different gases can be used depending on the design of the receiver-reactor 80, although an infrared-absorbing gas, e.g. water vapour, is naturally provided in the absorption area 83 while an infrared absorption in the area section 87 is not mandatory.

Still simultaneously, the area section 90 is supplied via the line 91 with a heat-transporting fluid, which flows outwards through the segment 92 of the absorber 81, thus cooling the latter and being heated in the process, and reaches the outside of the segment 94 via the flow transfer channel 93 indicated symbolically as an arrow, through which it flows from the outside inwards, heating the same and being itself cooled in the process, before finally leaving the area 90 via the line 95. The lines 91 and 93 are connected to each other behind the area 82 so that a circuit of heat-transporting fluid through the segments 92 and 94 results. This circuit is utilized for the recuperation of the heat from the cooling of the respective absorber segments 84, 86, 92, 94 from the reduction temperature $T_{red}$ to the oxidation temperature $T_{ox}$. If the absorber 81 is namely rotated clockwise (cf. the arrow 96) by a step of 90 degrees, the segment with the reduction temperature and the segment with the oxidation temperature are located in the area 90, wherein, through the circuit via the lines 91, 95 and the flow transfer channel 93, heat from the segment with the reduction temperature is transferred to the segment with the oxidation temperature and can thus be recuperated: the heat removed for cooling for the oxidation of one segment is transferred to the other segment to be heated for the reduction.

In this cycle as well, heat is constantly removed from the black-body radiation via the line 85 and utilized.

This results in a method in accordance with the invention, wherein a warmer reduction zone and a colder oxidation zone are provided on the absorber, which are turned toward the absorption area and subsequently away from the same periodically for heating and cooling, as well as in a receiver-reactor according to the invention, in which the absorber is preferably divided into areas (segments), which can be alternately brought in a serviceable state into connection with the absorber area and with an oxidation zone (area 87), wherein an intermediate zone (area 90) is preferably provided for the recuperation of heat. This results further in an embodiment of the receiver-reactor according to the invention in which the transport arrangement is preferably configured to feed an oxidizing gas to the absorber on a side facing away from the absorption area.

It is noted here that, for example in an embodiment of the receiver-reactor in accordance with FIG. 2 or 4, cooling can be accelerated by pivoting the heliostats away from the receiver-reactor. In this case, at least two receiver-reactors are preferably provided, the operation of which is controlled in such a manner that the heliostats are pivoted cyclically back and forth from one receiver-reactor to the other, which are respectively heated for the reduction and cooled for the oxidation.

In an embodiment not depicted in the figures, the heat-transporting medium is under positive pressure in the absorption area, with the consequence that the absorption area is reduced, which in turns allows the realization of an absorption rate of over 95%. In this case, the transport arrangement and the absorption area are configured for a positive pressure of the heat-transporting fluid.

The invention claimed is:

1. A method for producing syngas by using solar radiation, in which a reactor of a receiver-reactor is periodically heated via an aperture provided therein for solar radiation using the solar radiation to an upper reduction temperature ($T_O$) for a reduction process and subsequently cooled to a lower oxidation temperature ($T_U$) for an oxidation process in the presence of an oxidation gas, comprising:
   guiding sunlight through an absorption chamber onto an absorber configured as the reactor, which includes a reducible/oxidizable material; and
   guiding a gas that absorbs black-body radiation of the absorber through the absorption chamber, wherein an absorption area is configured so that 80% or more of the black-body radiation of the absorber present on a path to the aperture is absorbed.

2. The method for producing syngas using solar radiation according to claim 1, wherein 85% or more of the black-body radiation of the absorber travelling on the path to the aperture is absorbed.

3. The method according to claim 1, wherein an at least oxidizing gas is used as an infrared-absorbing gas, said gas being guided through the absorption chamber to the absorber in such a manner that it participates in the redox reaction in the absorption chamber and is reduced by the absorber in the oxidation phase.

4. The method according to claim 3, wherein the at least oxidizing gas is guided into a separation station downstream from the absorber and syngas is separated from the at least oxidizing gas in the separation station, wherein the oxidizing gas is further guided in the circuit back to the absorption chamber and is cooled in this circuit in a heat exchanger before the absorber in the direction of flow.

5. The method according to claim 3, wherein the at least oxidizing gas is guided during the reduction process and/or during the oxidation process of the absorber through the same in a such a manner that said gas is heated convectively.

6. The method according to claim 1, wherein a gas whose partial pressure of oxygen at a temperature prevailing during the reduction phase of the reactor is equal to or less than the higher value of the partial pressure of oxygen of water vapour or $CO_2$ at this temperature is used as an infrared-absorbing gas, and wherein this gas is guided at least during the reduction phase through the absorption chamber to the absorber in such a manner that the latter is reduced in the presence of this gas.

7. The method according to claim 1, wherein the absorbing gas is removed as a heat-transporting fluid from the receiver-reactor after absorbing the black-body radiation of the absorber without participating in the redox reaction, and wherein an at least oxidizing gas is fed to the absorber for the redox reaction separately from the absorbing gas.

8. The method according to claim 7, wherein the at least oxidizing gas is fed to a side of the absorber facing away from the absorption area.

9. The method according to claim 7, wherein the at least oxidizing gas is guided through the absorber, wherein the absorber is configured as a tube bundle for the oxidizing gas.

10. The method according to claim 1, wherein a heteropolar gas selected from the group consisting of $CO_2$, water vapour, $CH_4$, $NH_3$, CO, $SO_2$, $SO_3$, HCl, NO and $NO_2$ or a mixture thereof is used as an infrared-absorbing gas.

11. The method according to claim 1, wherein gas heated by absorption of the black-body radiation of the absorber is removed from the absorption area as soon as it is partially heated and/or a partially heated gas is fed to the absorption area, and wherein the feeding into the absorption area takes place at the respective site where the temperature in the absorption area essentially corresponds to the temperature of the partially heated gas.

12. The method according to claim 1, wherein cerium dioxide ($CeO_2$), doped $CeO_2$ or perovskite are used as reducible/oxidizable material.

13. A solar reactor-receiver comprising:
   an optical aperture for radiation of the sun;
   an absorber arranged in a path of incident light;
   a redox reactor for a redox reaction;
   a transport arrangement in which an oxidizing gas is guided in a serviceable state to and away from the reactor, wherein the absorber is configured as the redox reactor; and
   an absorption chamber is arranged between the aperture for the radiation of the sun and the absorber in the path of the incident light and in the path of black-body radiation of the absorber, wherein the transport arrangement includes a circuit line arrangement, in which a heat-transporting fluid circulates, wherein the circuit is configured in such a manner that the heat-transporting fluid can be charged with heat in an absorption area and cooled again in the heat exchanger, wherein the heat-transporting fluid is an infrared-absorbing gas that absorbs black-body radiation of the absorber travelling on a path through the aperture.

14. The solar reactor-receiver according to claim 13, wherein the heat-transporting fluid is composed and the transport arrangement and the absorption area are configured in such a manner that, during the operation of the reactor, the heat-transporting fluid absorbs≥80% of the black-body radiation of the absorber present on a path through the aperture for the radiation of the sun.

15. The solar reactor-receiver according to claim 13, wherein the heat-transporting fluid is a gas that is reducible during the oxidation of the absorber and wherein the reducible/oxidizable material of the absorber is arranged on the same in such a manner that it lies in a serviceable state in the flow path of the heat-transporting fluid so that the fluid is reduced in the oxidation phase of the redox reactor.

16. The solar reactor-receiver according to claim 13, wherein the heat-transporting fluid is an infrared-absorbing gas with a partial pressure of oxygen which, at a temperature prevailing during the reduction phase of the redox reactor, is equal to or not as high as the higher value of the partial pressure of oxygen of water vapour or $CO_2$ at this temperature, and wherein the circuit line arrangement is configured to guide this gas at least during the reduction phase through the absorption chamber to the absorber in such a manner that the absorber is reduced during operation during its reduction phase in the presence of this gas.

17. The solar reactor-receiver according to claim 13, wherein the circuit line arrangement further includes a separation station configured to separate syngas from the heat-transporting fluid and make it available for removal from the circuit.

18. The solar reactor-receiver according to claim 13, wherein the reducible/oxidizable material is arranged on the surface of the absorber facing the absorption chamber and the absorber is configured so as to be plate-shaped.

19. The solar reactor-receiver according to claim 13, wherein the absorber is configured in such a manner that heat-transporting fluid can flow through it and the surface of the area of flow consists at least partially of reducible/oxidizable material.

20. The solar reactor-receiver according to claim 13, wherein the receiver-reactor further includes a line arrangement for at least oxidizing gas that guides said gas separately from the absorbing gas.

21. The solar reactor-receiver according to claim 20, wherein the absorber is linked to the circuit line arrangement and the further line arrangement for oxidizing gas and forms a partition between the flow path of the heat-transporting fluid and the flow path of the oxidizing gas.

22. The solar reactor-receiver according to claim 20, wherein the absorber is configured as a section of the further line arrangement and includes at least one line for the at least oxidizing gas, on the inner wall of which reducible/oxidizable material is arranged.

23. The solar reactor-receiver according to claim 22, wherein the absorber is configured as a tube bundle for at least oxidizing gas.

24. The receiver-reactor according to claim 13, wherein the gas is a heteropolar gas selected from the group consisting of $CO_2$, water vapour, $CH_4$, $NH_3$, CO, $SO_2$, $SO_3$, HCl, NO and $NO_2$ or a mixture thereof.

25. The receiver-reactor according to claim 13, wherein the reducible material is cerium dioxide, doped $CeO_2$ or perovskite.

26. The receiver-reactor according to claim 13, wherein the transport arrangement includes one or more lines for heat-transporting gas connected to an absorber area and configured in such a manner that partially heated gas is removed from the absorber area and/or partially heated gas can be fed at a site at which the temperature of the gas in the absorber area essentially corresponds to the temperature of the partially heated gas fed in.

27. The receiver-reactor according to claim 13, wherein the walls of the absorption chamber and/or the absorber are free of cooling means that are activated during normal operation.

28. The receiver-reactor according to claim 13, wherein the transport arrangement and the absorption chamber are configured for a positive pressure of the heat-transporting fluid.

29. The receiver-reactor according to claim 13, wherein a secondary absorber including reducible/oxidizable material is provided and configured in such a manner that it can be heated by the radiation of the absorber and radiates itself during operation into the absorption area, wherein it is configured so as to be plate-shaped and not overshadow the absorber.

* * * * *

UNITED STATES PATENT AND TRADEMARK OFFICE
CERTIFICATE OF CORRECTION

PATENT NO. : 12,240,756 B2
APPLICATION NO. : 17/051693
DATED : March 4, 2025
INVENTOR(S) : Ambrosetti et al.

It is certified that error appears in the above-identified patent and that said Letters Patent is hereby corrected as shown below:

On the Title Page

Column 1, (71) Applicants, Line 2 Delete "S.P.A," and insert -- S.P.A., -- therefor In the Specification Column 2, Line 39 After "proposed." delete "¶"

Column 4, Line 47 Delete "4." and insert -- 14. -- therefor

Column 4, Line 51 Delete "5," and insert -- 15, -- therefor

Column 4, Line 53 Delete "4" and insert -- 14 -- therefor

Column 4, Line 63 Delete "4" and insert -- 14 -- therefor

Column 5, Line 36 Delete "4" and insert -- 14 -- therefor

Column 10, Line 5 Delete "1" and insert -- 4 -- therefor

Column 13, Line 8 Delete "100" and insert -- 104 -- therefor

In the Claims

Column 17, Line 40 In Claim 1, after "syngas" delete "by"

Column 20, Line 12 In Claim 24, after "The" insert -- solar --

Column 20, Line 16 In Claim 25, after "The" insert -- solar --

Signed and Sealed this
Third Day of June, 2025

Coke Morgan Stewart
*Acting Director of the United States Patent and Trademark Office*

CERTIFICATE OF CORRECTION (continued)
U.S. Pat. No. 12,240,756 B2

Column 20, Line 17 In Claim 25, delete "dioxide," and insert -- dioxide ($CeO_2$), -- therefor Column 20, Line 19 In Claim 26, after "The" insert -- solar --

Column 20, Line 27 In Claim 27, after "The" insert -- solar --

Column 20, Line 31 In Claim 28, after "The" insert -- solar --

Column 20, Line 35 In Claim 29, after "The" insert -- solar --